(12) United States Patent
Soderquist

(10) Patent No.: US 6,425,064 B2
(45) Date of Patent: Jul. 23, 2002

(54) MEMORY STRUCTURE FOR STORAGE OF MEMORY VECTORS

(75) Inventor: Ingemar Soderquist, Linkoping (SE)

(73) Assignee: SAAB Dynamics, Linköping (SE)

( * ) Notice: Subject to any disclaimer, the term of this patent is extended or adjusted under 35 U.S.C. 154(b) by 0 days.

(21) Appl. No.: 08/973,425

(22) PCT Filed: Jun. 5, 1996

(86) PCT No.: PCT/SE96/00748

§ 371 (c)(1),
(2), (4) Date: Dec. 8, 1997

(87) PCT Pub. No.: WO96/42055

PCT Pub. Date: Dec. 27, 1996

(30) Foreign Application Priority Data

Jun. 9, 1995 (SE) ............................................... 9502113

(51) Int. Cl.[7] ............................................... G06F 12/06
(52) U.S. Cl. ...................................................... 711/171
(58) Field of Search ................................ 711/170, 171, 711/172, 173, 5; 712/6, 10, 22

(56) References Cited

U.S. PATENT DOCUMENTS

| 4,621,339 | A | | 11/1986 | Wagner et al. ................ 712/22 |
| 4,747,070 | A | | 5/1988 | Trottier et al. ............... 711/158 |
| 4,858,107 | A | | 8/1989 | Fedele .......................... 345/568 |
| 5,602,780 | A | * | 2/1997 | Diem et al. ............. 365/189.01 |
| 5,642,444 | A | * | 6/1997 | Mostafavi .................... 382/303 |
| 5,838,985 | A | * | 11/1998 | Ohki ............................. 712/16 |

FOREIGN PATENT DOCUMENTS

EP          0282070          9/1988

* cited by examiner

Primary Examiner—Kevin L. Ellis
(74) Attorney, Agent, or Firm—Swidler Berlin Shereff Friedman, LLP

(57) ABSTRACT

A memory structure for storing memory vectors in at least one storage location. A plurality of storage locations store memory vectors. After configuration each storage location has a length adapted to a length of a memory vector stored therein. The storage locations are arranged parallel to each other and extend from a memory input deeper into the memory such that each memory vector is arranged to be undividedly stored in sequential order with a beginning of a vector at the memory input. Storage place addressing is made to the memory input. Input buffers are arranged to input the memory vectors in unbroken sequence according to the addressing. The vectors are inputted in a buffer-by-buffer manner. Output buffers are arranged to output the memory vectors in unbroken sequence according to the addressing in a buffer-by-buffer manner.

18 Claims, 7 Drawing Sheets

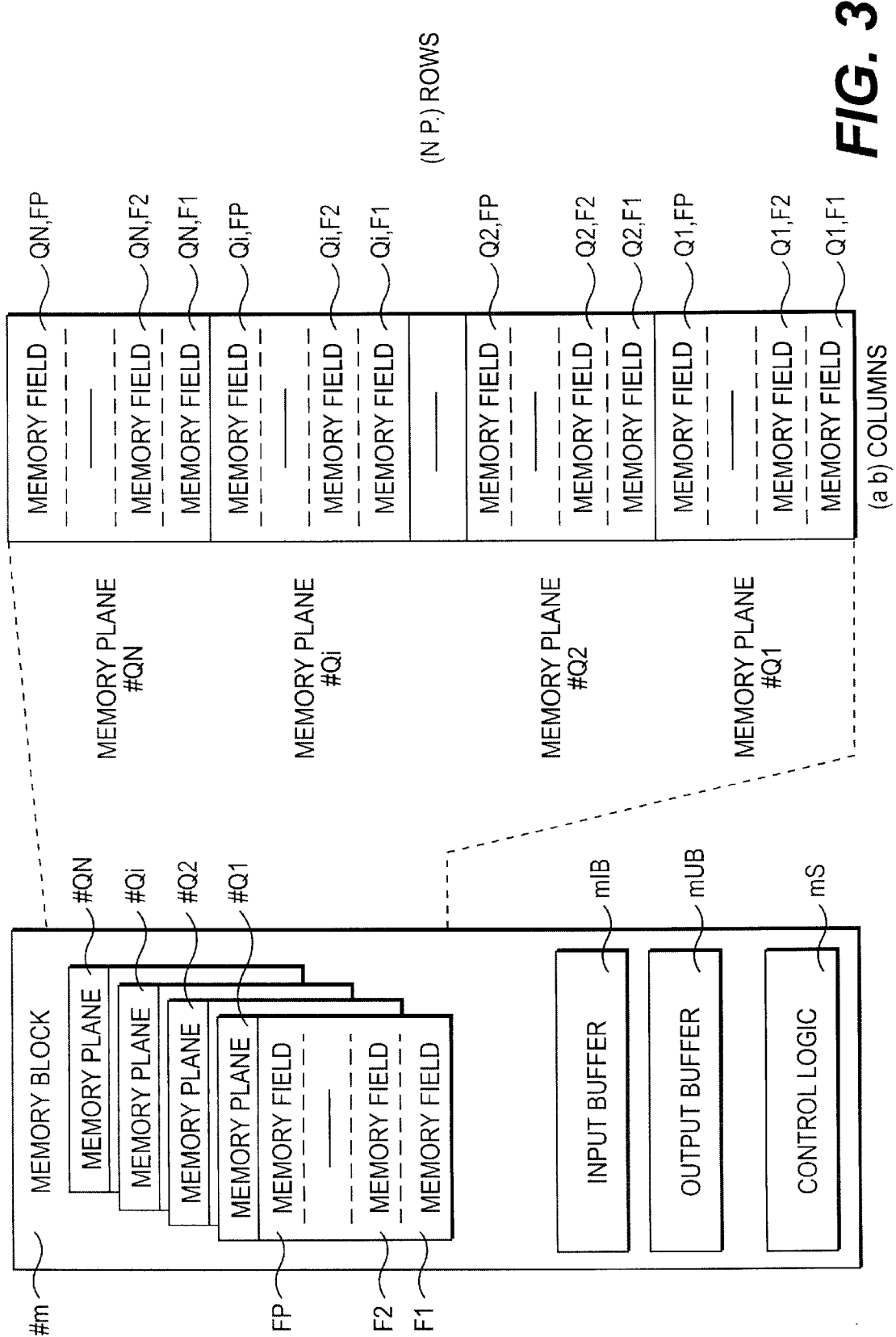

```
                    ┌─────────────┐
                    │   START     │
                    │  (ACCESS)   │
                    └──────┬──────┘
                           │
           ┌───────────────▼────────────────┐
           │ ACTIVATE WRITE SEQUENCE        │
           │ ALTERNATIVELY READ SEQUENCE.   │
           └───────────────┬────────────────┘
                    ┌──────▼──────┐
                    │    STOP     │      FIG. 4A
                    │  (ACCESS)   │
                    └─────────────┘
```

START (WRITE) → IS READING IN THE IDLE MODE? → NO (loop) / YES → DYNAMIC CONFIGURING?

- YES: ACTIVATE THE REQUIRED MEMORY PLANE IN THE MEMORY STRUCTURE. START READING IN. ALLOCATE SPACE ACCORDING TO REQUIREMENTS. → HAS THE VECTOR BEEN TRANSFERRED? → NO (loop) / YES → ADJUST ALLOCATED SPACE IF THE WHOLE OF THE SPACE HAS NOT BEEN USED. → STOP (WRITE)

- NO: ACTIVATE THE REQUIRED MEMORY PLANE IN THE MEMORY STRUCTURE. START READING IN. → HAS THE VECTOR BEEN TRANSFERRED? → NO (loop) / YES → STOP (WRITE)

FIG. 4C

START (READ) → IS READING OUT IN THE IDLE MODE? → NO (loop) / YES → ACTIVATE THE REQUIRED MEMORY PLANE IN THE MEMORY STRUCTURE. START READING OUT. → IS READING OUT IN THE IDLE MODE? → NO (loop) / YES → STOP (READ)

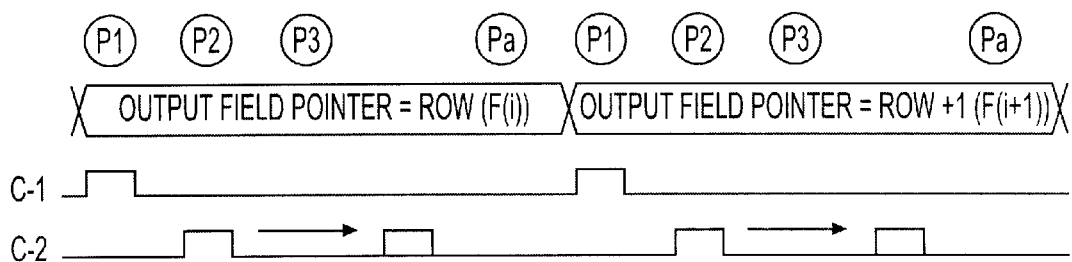
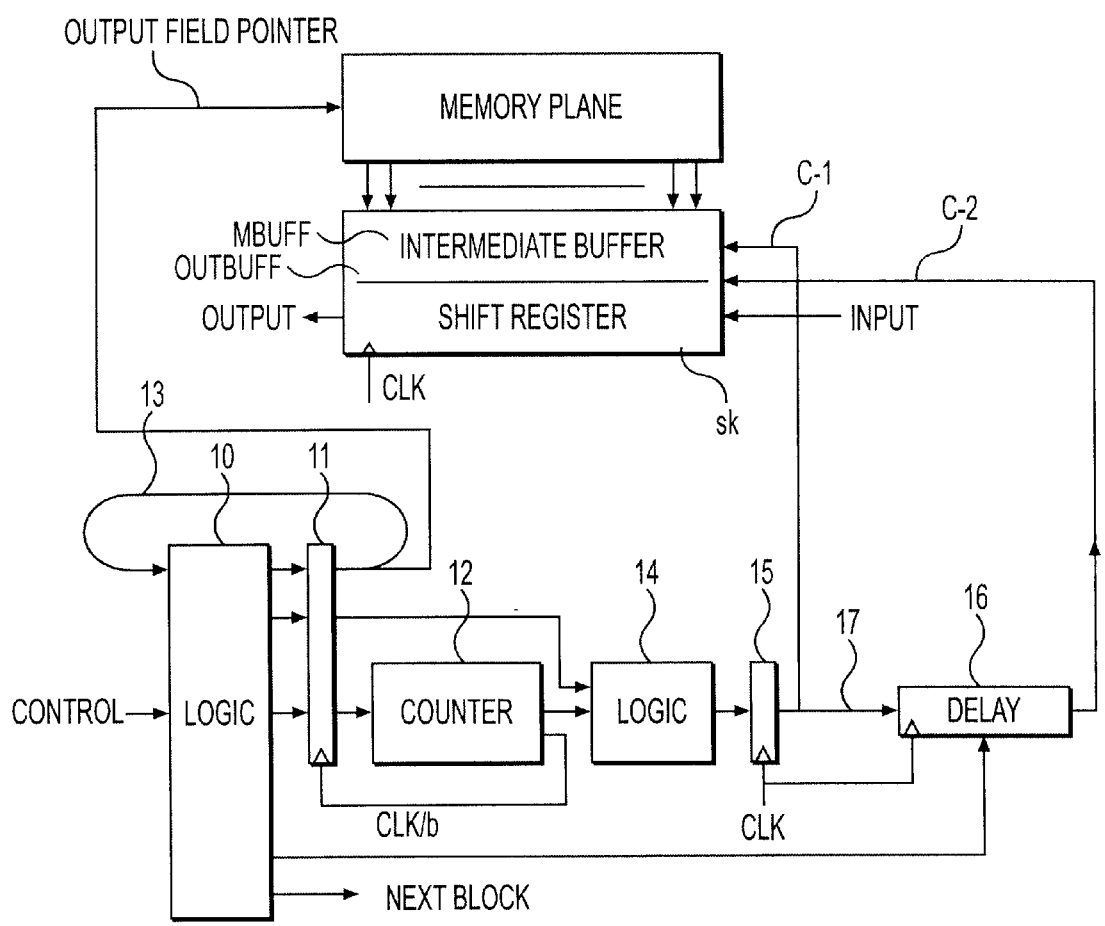
FIG. 6

MEMORY STRUCTURE FOR STORAGE OF MEMORY VECTORS

FIELD OF THE INVENTION

The present invention relates to a memory structure.

BACKGROUND TO THE INVENTION

The development of memories has occurred simultaneously with the development of computer processors. This means that the development of processors has guided the development of memory. Therefore it has been traditional that information in a memory is arbitrarily divided into bit groups (called bytes from now on), with a fixed number of bits, most often being addressed independently of earlier selected information. This leads to the address decoder having to be able to reach an arbitrary position in the memory within a certain access time in order to read or to write information there. The data transfer speed is inversely proportional to the access time. The access time is naturally dependent on which sort of manufacturing technology is used for the memory. VLSI-technology (VLSI=Very Large Scale Integration) is used and efforts are made to minimize the size and complexity of the circuits. For a given technology the size of the memory is always limited by the propagation speed of the signals. At the same time there is also the relationship that for traditional architecture increased memory area implies increased access time because the complexity of the address decoder increases when the memory increases. The demand for data processing speed is constantly increasing. Since the complexity of the address decoder increases and the propagation speed is constant, then the total storage space, that is to say the addressable surface where information can be stored, always decreases with increased computer speed.

In many fields of use which have become of immediate importance in the last years, such as telecommunications, radar, bulk memories for computers etc., information is not handled in the form of bytes but as sequences of bytes which are called vectors. In modern digital telephone systems and in data communication systems packets of information, ATM, are used. In radar the information is in the form of pulses. After digitalization the pulse can be considered as being a large vector, defined by the start point and length.

In many applications large blocks of connected bytes are handled in the same way, for example a block of text in a word processor. Another example is swap memory in computers. These have in common that a large amount of information (vector) is handled as a whole. Addressing at the byte level is not used.

OBJECT OF THE INVENTION

An object of the invention is to produce a memory structure which is adapted for storing vectors.

Another object of the invention is to produce a memory structure which gives fast and continuous access to storage places for the reading and/or writing of vectors.

A further object of the invention is to produce a structure where the writing of a vector can take place at the same time as, and independently of, the reading of a vector is taking place.

Yet a further object of the invention is to produce a memory structure where the writing of a vector can take place almost simultaneously with the reading of it.

Yet another object of the invention is to produce a memory structure where the time for outputting written data can be controlled right down to the clock period.

Yet another object of the invention is to produce a memory structure which can be used as a complement to the current type of memory structure for a computer.

A further object of the invention is to produce a memory structure which permits the treatment of a stored vector in parallel by a plurality of storage positions for vectors in order to either reposition the processed vector or to get out a processing result.

SUMMARY OF THE INVENTION

The above objects are achieved with a memory structure which has the characteristics described below.

According to the invention, after configuration, each of the storage positions in the memory has a length adapted for the length of the large vectors and is arranged in a parallel fashion, extending from an information input and deeper into the memory so that each vector is arranged to be stored undivided in consecutive order with the beginning of the vector by the input of the memory, whereby addressing is arranged to take place to the input of the memory. There are means acting as shift registers for the inputting of information in undivided order to the storage positions in the memory.

The memory is preferably divided transversely into memory blocks, so that all storage positions each have a part in each memory block. The storage positions in the memory can be lengthenable through joining together of one or more memory blocks. Each memory block can comprise:

as means acting like shift register;
   an input buffer with serial inputting of data analoguosly with a shift register;
as storage positions:
   a number of data memory fields in which information from the input buffer can be sequentially inputted.

In this connection a control logic is arranged in each memory block. The control logic controls the input of information in memory fields via the input buffer whereby the memory blocks are cascade coupled with each other through the input buffers in them being cascade coupled with each other, so that information is serially stepwise feedable through a number of the buffers in the different memory blocks after one another, and the control logic in each memory block is arranged to inform the control logic in the next memory block when the memory fields in its own memory block are filled with information or all information in them is read out, so that the control logic in the next memory block can take over the job of writing the information to this memory block. There can be means acting like shift registers for the outputting of information in undivided order from the storage positions in the memory. Moreover there can be means for data processing of data stored in a parallel manner in the different memory blocks.

ADVANTAGES WITH THE INVENTION

The memory structure according to the invention permits the setting up of a large and expandable storage space for information, continuous data transfer and at the same time extremely high transfer speeds. Expansion of the storage space for a vector, and thereby the size of the memory, can be performed without affecting the data transfer speed as the interface with the memory seen from outside is unchanged.

With the memory structure according to the invention a continuous data transfer can be performed at approximately 0.5–1 Gbytes/sec compared with todays 30–100 Mbytes/sec. This implies a factor of ten times faster with the use of corresponding basic technology. The memory structures in themselves are not dependent on the technology used but can be used for arbitrary storage technologies (RAM, magnetic memory, optical memory etc.).

BRIEF DESCRIPTION OF THE DRAWINGS

The invention is described in more detail below with reference to the appended drawings, where FIG. 3 shows the internal structure of a memory block in more detail than in FIG. 2, FIGS. 4a–4c shows a flow diagram for the overall control logic for the memory, FIG. 6 shows a second embodiment of the memory structure according to the invention.

DETAILED DESCRIPTION OF THE EMBODIMENTS

Definitions

Stored information Refers to a number of vectors which each, seen from outside, are treated continuously and in undivided form.

Vector Refers to the whole continuous amount of information which is to be processed in one piece. A vector is defined from outside with the help of a starting point, or identity, and length.

Byte group Part of a vector adapted to size of a memory field. A vector can be described as a sum of byte groups.

Figure 2:
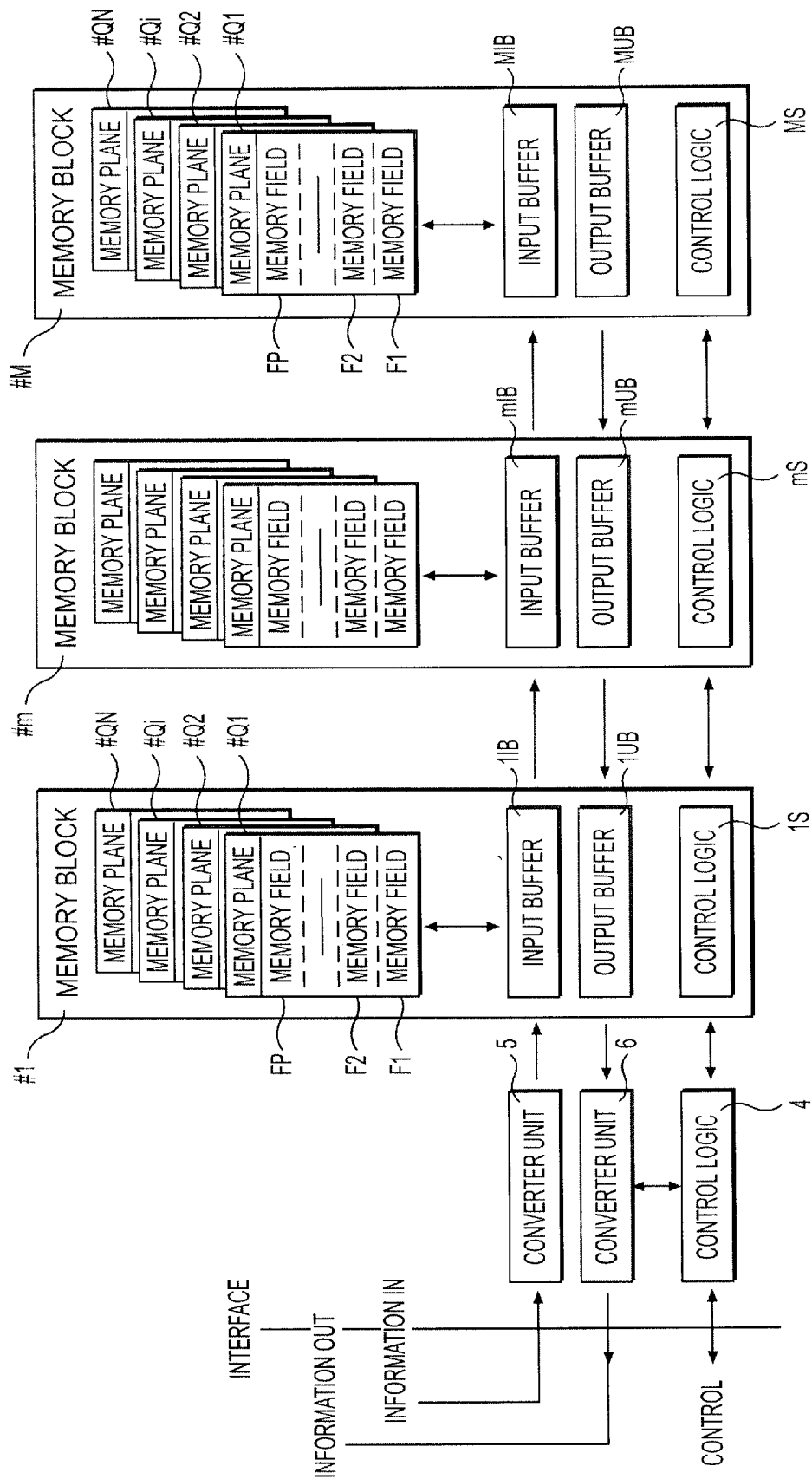
FIG. 2 shows a first embodiment of the memory structure according to the invention.

Memory structure Refers to the whole of the system according to FIG. 2. The memory structure consists of one or more memory blocks, the converter units 5, 6 and control logic 4.

Memory block Refers to a unit with a well-defined function which only communicates with the nearest neighbors, see FIG. 2. The memory structure is always expanded with a whole number of new memory blocks.

Storage position Refers to the part of the memory structure's total memory area which after configuration is adapted to the length of the current vector. The storage positions are distributed from memory block #1 and inwardly, see FIG. 1.

Memory plane The part of a memory block which after configuring is being allotted to a certain vector (the identity).

Memory field The part of a memory plane which is processed in one piece. The size corresponds to that of the input/output-buffers.

Figure 1:
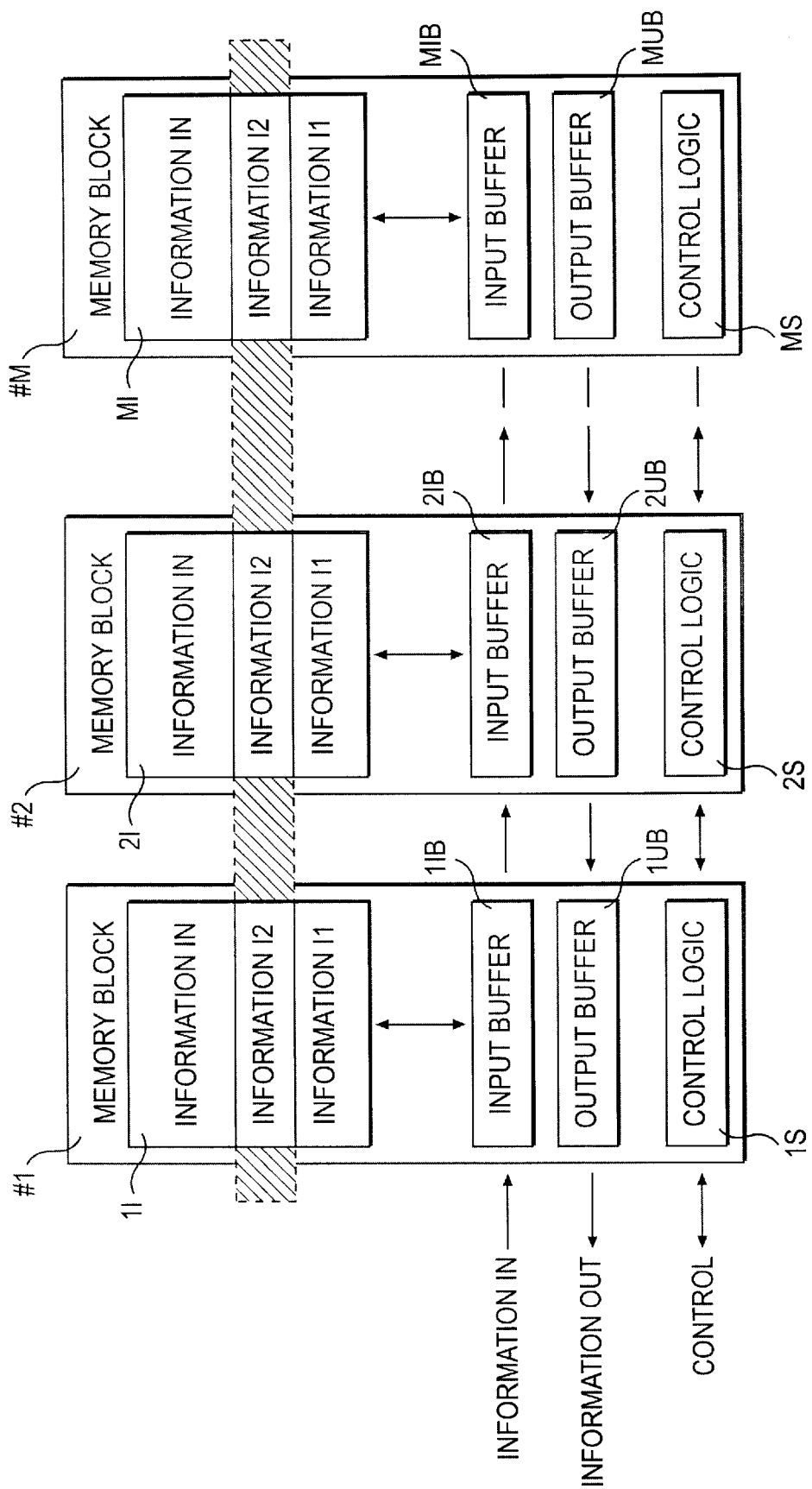
FIG. 1 shows in general the principle for a memory structure according to the invention.

FIG. 1 shows a number of memory blocks #1, #2, . . . #M, which are cascade coupled with each other. Each memory block has an information part 1I, 2I, . . . MI, and input buffer 1IB respectively 2IB . . . respectively MIB, an output buffer 1UB respectively 2UB . . . respectively MUB and a control logic 1S respectively 2S . . . respectively MS. Each memory block can be on a separate chip and a selected number of chips can be coupled together with each other in order to form a selected large memory. It is also possible and appropriate to have several memory blocks on one chip whereby several multiblock chips can be coupled together in cascade. Each of the storage positions in the memory has a length adapted to the length of large vectors. The blocks are arranged in parallel extending from an in/output for information and deeper into the memory so that each vector is arranged to be stored undivided in consecutive order via the input buffers with the beginning of the vector at the input/output of the memory and similarly to be outputted in consecutive order via the output buffers when the need for this occurs (see the embodiment in FIG. 7). Addressing is made to the in/output of the memory.

In the embodiment shown in FIG. 2 the memory structure comprises a number of cascade coupled units or memory blocks #1–#M, control logic 4 and where appropriate converter units 5, 6. The memory blocks shown here have each a constituent block with several memory planes #11–#1N respectively "M1–#MN lying behind one another which each comprise a number of memory fields F1–FP. It should be noted that from now on in the description a special memory field in the memory has a reference which identifies which memory block and which memory plane it belongs to, for example #m, Qi, Fj for a memory field Fj in the memory plane Qi in the memory block #m. This reference system has been applied throughout.

It is, however, obvious that the memory blocks in practice can have a surface structure with the planes arranged spread-out at different positions on the surface or arranged as memory fields one after another, so that for example in the case of a chip with several blocks the memory fields in memory blocks #2/memory plane #Q1 are arranged as a direct continuation of the memory fields in the memory block #1/memory plane #Q1 etc.

As can be seen from FIG. 3 the memory structure has several addressable storage positions or memory planes Q1 . . . Qi . . . QN (i=1 . . . N). Each memory block #m has a number of memory fields F1 to FP allocated to each addressable memory plane Qi.

Each memory block #m is physically organised in $W_m$ rows (corresponding to N×P in FIG. 3) and a×b columns. Each row forms a memory field and contains a number of byte groups or words (a) each with a suitable number of bits (b). The memory block #m is therefore $W_m$×a×b bits large. The memory structure has a total size of $(W_1+W_2+ \ldots +W_M)$×a×b bits. It is also possible to conceive the special case where a, b and W vary between memory blocks but this is not taken up here.

A vector Vi with the length $L_i$ words is stored as $L_i/a$ partial vectors in memory fields M1, F1, . . . , M1, FP; M2 F1, . . . , M2 FP; . . . , MN F1, . . . , MN FP. After configuration it is valid that $L_i=a\times(O_{i1}+O_{i2}+ \ldots +O_{iM})$ words, where $O_{im}$ is the contents of Mi Fm (i=1–N, m=1–P). The size of vector Vi is consequently $a\times b\times(O_{i1}+O_{i2}+ \ldots +O_{iM})$ bits. For each memory block it is also valid that the number of rows always corresponds to the sum of the number of memory fields. $W_m=O_{1m}+O_{2m}+ \ldots +O_{Nm}$.

Vectors of varying lengths can be stored at the same time in the memory structure.

The memory structure can be configured in various ways. Seen from outside the vectors are addressed only from the starting point (the identity) #1 Mi F1 where i is any number between 1 and N, and F1 is the first memory field in the memory block #1 in the memory plane Mi. The length of the vectors $L_i$ is defined by the configuration. The configuration can be static or dynamic.

In static configuration all the $O_{im}$ are predetermined. The control logic 4 has knowledge of the number N of storage positions Mi as well as the length of the respective storage positions $L_j$. The control logic 1S–MS in the memory blocks has knowledge of starting point #1 Qi F1 and the length $O_{im}$ for the respective memory block. The end point #m Qi Fj is defined indirectly by the starting point and length.

In dynamic configuration the length of the current memory plane or storage position Mi is changed during writing. The information vector is assumed from outside to be followed by information on the length as well as other global information. This information can alternatively be found in the first byte group as a head of the vector Vi. The control logic can then read, use and change this information in accordance to how it extends further into the memory structure. After the head the information follows sequentially.

With static configuration it is assumed that the information vector which is read from or written into a storage position Qi has a length which corresponds to the configuration. With static configuration the head can be left out.

Every memory block #i has an input buffer iIB with a buffer store comprising a number of storage bits for each storage memory field in the memory plane for incoming information and an output buffer iUB with the same buffer storage size as the input buffer for outputting information. There is furthermore a control logic iS in order to control the writing and reading of information in the memory plane and thereby in which of the memory field or fields therein.

The computer unit which via interface 5, 6 (see FIG. 2) is connected to the memory structure according to the invention loads incoming information through the information inport and takes out outputted information from the information outport in the form of vectors, for example data packets. Each vector can be equipped with a head containing identity, length etc. Alternatively the necessary information can be given to the interface by any other way which is obvious for the man skilled in the art. A control logic 4 is coupled to the interface in order to control the memory in accordance with what has been read from it. The control logic 4 can furthermore be equipped with an internal memory (not shown) for storing data concerning the stored vectors and where these are stored in the memory and where new vectors can be stored. Thus the addressing to memory takes place under the influence of control logic 4. This can be seen from FIG. 4A.

FIGS. 4A–4C show a flow diagram of an embodiment of the way of the control logic works, partly during activation (FIG. 4A), partly during writing into the memory (FIG. 4B) and partly during reading from the memory (FIG. 4C). The flow diagrams are so clear that a close description of the different stages does not need to be made.

As will be described in more detail below the information input in to the memory is suitably of parallel type, that is to say in the form of parallel bytes of suitable length, for example 8, 16, 32 bits. If pure serial information is inputted then a conversion from the bit form to parallel byte form takes place in the converter unit 5. Similarly a conversion from parallel bytes to bits should be performed in the converter unit 6 if this is necessary. It should be noticed that there is nothing which prevents that the input information in the information inport being in serial bit form and the information in the information outport being in parallel byte form or vice versa in which case only one converter unit 5 or 6 is necessary.

During dynamic configuration (see FIG. 4B) the head of each information vector which is to be written in is read. The information in this is used partly to determine how much memory space the vector will take up and partly in order to activate the control logic 1S in the first memory block #1 and to give it information on how many of the following control logics iS in the other memory blocks #i will need to be activated.

In practice every stored vector will have its beginning in memory field F1 in one of the planes Qi in memory block #1 and to extend from there deeper in to the memory. One can consider the storage of a vector being performed as a single continuous string. The vectors will in this way be arranged in parallel and addressing to them will take place to the beginning of the different planes in the memory block #1. Many of the memory fields F1–FP will actually be used in each memory block for storage so that the storage can be considered as being folded but in practice in fact the whole vector will lie arranged in an unbroken sequence from beginning to end from memory block to memory block.

Every control logic in the memory blocks has inside it a memory with information on which memory planes and which memory fields in them are empty or are already filled. When vectors which have to be stored arrive, a search is first made either in control logic 4 or in control logic 1S to find an available storage plane.

Figure 5:
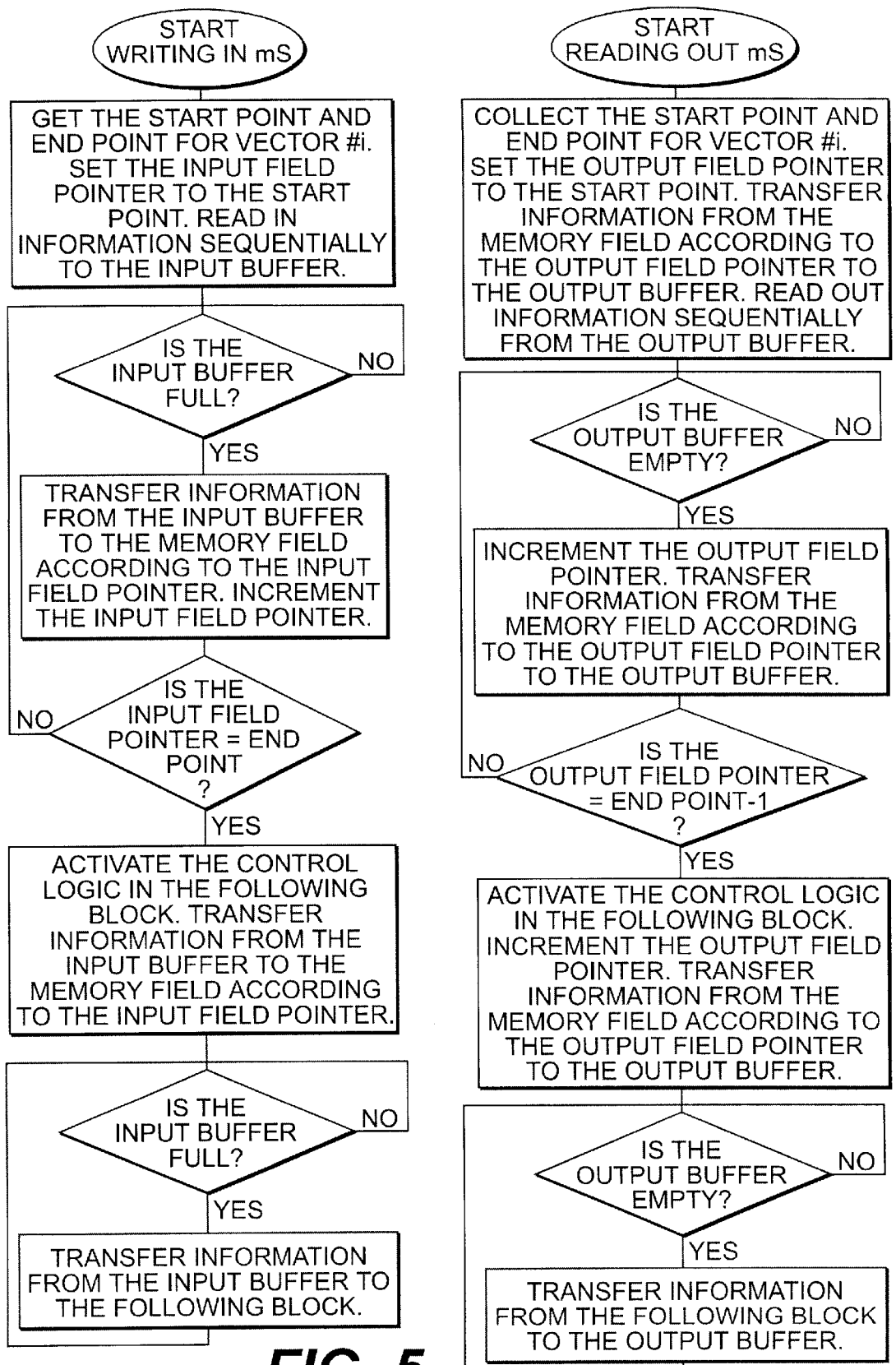
FIG. 5 shows a flow diagram for the control logic in a memory block.

As is evident from FIG. 5, which shows an embodiment of the flow diagram for each control logic 1S–MS in the memory blocks, the writing begins when the information, the vector, passes the interface (see FIG. 2). The configuration does not have to be completed for all the memory blocks because this is performed successively in accordance with the propagation of the information down in the memory. Assume that plane Qi, where i is a number between 1 and N, is shown to be empty. It should be observed that a vector is always stored in the same plane, for example Qx, where x is a number between 1 and N, in all the different blocks that is to say in plane #1 Qx; #2 Qx; #2 Qx and so on. The incoming vector begins to be fed into the input buffer 1IB. As soon as it is filled with a byte group a transfer of this to the first storage memory field F1 in plane #1 Qx takes place. The input buffer is filled in a manner analogous with a shift register but output to the memory fields can take place either serially or in parallel, and preferably in parallel so that the whole of the memory content of the input buffer is emptied.

In analogy with a shift register a direct refilling takes place whereafter the whole contents of the memory is emptied to the next memory field F2 in plane #1 Qx and so on until the last memory field FP in the plane #1 Qx is filled. The control logix 1S has in this connection an input-field pointer (not shown) which gives the memory field which is current for writing.

Subsequently the input buffer 1IB is controlled to begin filling input buffer 2IB, in analogy with a shift register, serially, that is to say parallel byte after parallel byte until this is filled. The whole of the serial length of the shift resister used as the buffer will be called from now on a serial byte, because it represents the number of clock signals, which is necessary in order to fill the buffer that is to say it represents the serial length of a parallel byte group.

When the input buffer is filled, it fills in the first memory field F1 in plane #2 Qx and the different following memory fields there are then filled in in the same way as the memory field in memory plane #1 Qx, i.e. controlled by the input-field pointer from the control logic. When the memory plane #1 Qx is filled, information in the input buffer 2IB of memory block #2 continues to be transferred over to the input buffer of the next memory block and subsequently from this to the memory fields in the next memory plane #3 Qx in this memory block and so on. It should be noted that it is possible to have many input and output buffers, for example in order to serve several memory planes simultaneously, even if this is not shown in any of the figures. The control unit can also be duplicated.

It should be noted that information can be inputted to the input buffers in the form of sequential parallel bytes, whereby each buffer in fact comprises as many parallel shift registers as there are bits in each byte. The expression parallel byte group is used for the number of bytes which fill an input/output buffer. When an input buffer is emptied to a memory field in a plane there is therefore a very large quantity of data which is transferred. Each memory field therefore comprises an extremely large number of parallel byte groups.

Data can be read and outputted from a memory field immediately after it has been written in.

As is evident from the flow diagram in FIG. 5 during reading, the content of one memory field at a time is transferred in parallel with the whole parallel byte group in the first field in the plane in question 1*i* to the output buffer 1UB and outputted serially, i.e. parallel byte after parallel byte.

When the transfer to the output buffer of the next to last memory field in plane #1 Qi has taken place the control logic 1S activates control logic 2*s* to transfer the contents in the first memory field #2 Qi to the output buffer 2UB. Directly after the last memory field FP has been transferred over to the output buffer 1UB and this has outputted its content of parallel bytes serially, an output buffer 2UB outputs its contents parallel byte after parallel byte serially to the output buffer 1UB so that this follows directly after the earlier contents of buffer 1UB.

In this manner there is no break in the outputted information. The information in the memory fields in plane #2. Qi is outputted step-by-step to the output buffer 2UB, controlled by an output field pointer (not shown) from the control logic 2S and outputted from it serially via buffer 1UB. When the next to last memory field FP in plane 2*i* is transferred to the output buffer 2UB, the control logic is activated for the next memory block in order that the memory field information shall be transferred to the output buffer of the memory block etc.

In the above described embodiment each output buffer in the different blocks serially outputs its contents, a parallel byte group, parallel byte after parallel byte to the next output buffer. This means that the controlling takes place parallel byte after parallel byte in both the input and output. Each parallel byte group can contain a relatively large number of parallel bytes in this case which means that the start of the output of a vector with data can take place with the relatively long time interval of a number of clock periods which is given by the length of the parallel byte group.

There are, however, applications when the controlling of the data output should be down at the clock period for the system in which the memory according to the invention forms a part. The head logic of the memory has information about in which parallel byte group the output shall take place and also the phase displacement which is needed within the time length of the parallel byte group for the outputting to take place at the exact desired time.

An embodiment of the memory with a control logic to achieve this is shown in FIG. 6. It is possible to have outputting of the same memory contents to different parts of the system at independently controllable time points and in that case it is possible to have many output buffers coupled to the memory planes. However, in the figures only one output buffer OUTBUFF is shown. Each output buffer comprises an intermediate buffer MBUFF in which during controlling the contents are transferable to shift register sk. The way of functioning for each output buffer is course similar whereby the description concerning OUTBUFF is valid for all of them.

When the local control arrangement in a memory block receives an indication that the memory contents in a memory plane are to be outputted via an output buffer OUTBUFF, the first memory field in this memory plane is loaded down in intermediate buffer MBUFF by means of a control signal C-1 for it. At the appropriate clock signal for the actual outputting the contents of the intermediate buffer is transferred by means of a control signal C-2 to the shift register sk for the timed outputting directly with controlling on the clock input CLK of the shift register. The contents in the next memory field is transferred to the intermediate buffer OUTBUFF either directly after the transfer from the intermediate buffer to the shift register or, preferably, at the beginning of the next whole parallel byte group period. There is, however, nothing which prevents the transfer to the intermediate buffer taking place any time during the interval before the transfer to the shift register sk, for example during the clock period directly before the transfer from the intermediate memory to the shift register.

Once the whole memory block is empty, as described above, information continues to be inputted into the output buffer for further transfer to the output. This data, because of the same controlling for the next following block, will come directly as a correctly timed continued serial byte group inputting in continuous order in the shift register sk on its serial input coupled to the shift register for the following output buffer in order to be outputted through the shift register to the output or the memory.

An example of a control means for the first output buffer OUTBUFF for the memory block for outputting the respective transfers from the respective memory fields in the memory plane to the intermediate buffer MBUFF and then from the memory buffer to the shift register sk is shown at the bottom of FIG. 6. When controlling concerning that data is to be outputted in the memory planes starting at a special point of time enters logic 10, this points first with an output field pointer to the first memory field in the memory planes after having passed through a small gate circuit 11, which allows through signals from the logic in the presence of a control signal CKL/b, where b is the number of parallel byte steps in the shift register SK counted by a counter 12. The output field pointer moves to the next memory field at the next control signal CLK/b and to the next with the next control signal etc. This is illustrated by the oval 13. Furthermore the phase displacement with respect to the phase for the output field pointer is illustrated in the upper part of the figure for the different positions P1–Pa, where a is the position length of a memory field, in the different fields Fi and F(i+1) whereby C-1 in this embodiment comes at the beginning of the output field pointer and C-2 is controllably displaced to the desired position, for example P2.

The output from the counter 12 together with an output from the logic 11 are input to a second logic 14 concerning the change of fields. The logic 14 then emits, according to the shown embodiment, the signal C-1 on its output which in the case shown controls the data transfer from the selected memory field to the intermediate buffer MBUFF via a small gate circuit 15 which emits the signal at the next clock signal CLK. The signal C-1 is also fed to the input of a delay unit 16 which on one control input has a signal 17 from logic 10 which signal, preferably in digital form, states the current delay for data in the intermediate buffer before transferal to the shift register SK1. This continues until the output field pointer has come to the last field in the memory plane which is to be outputted. The signal from logic 14 from logic 10 then no longer occurs. Instead, at the next to last output field pointer position logic 10 provides an output to the next block to activate the control logic there.

Although this is not shown, many controllable delays separate from logic 10 can be arranged either in order to if necessary give the signal C-1 with the desired delay and/or in order to give different delays to different output buffers or the like.

Figure 7:
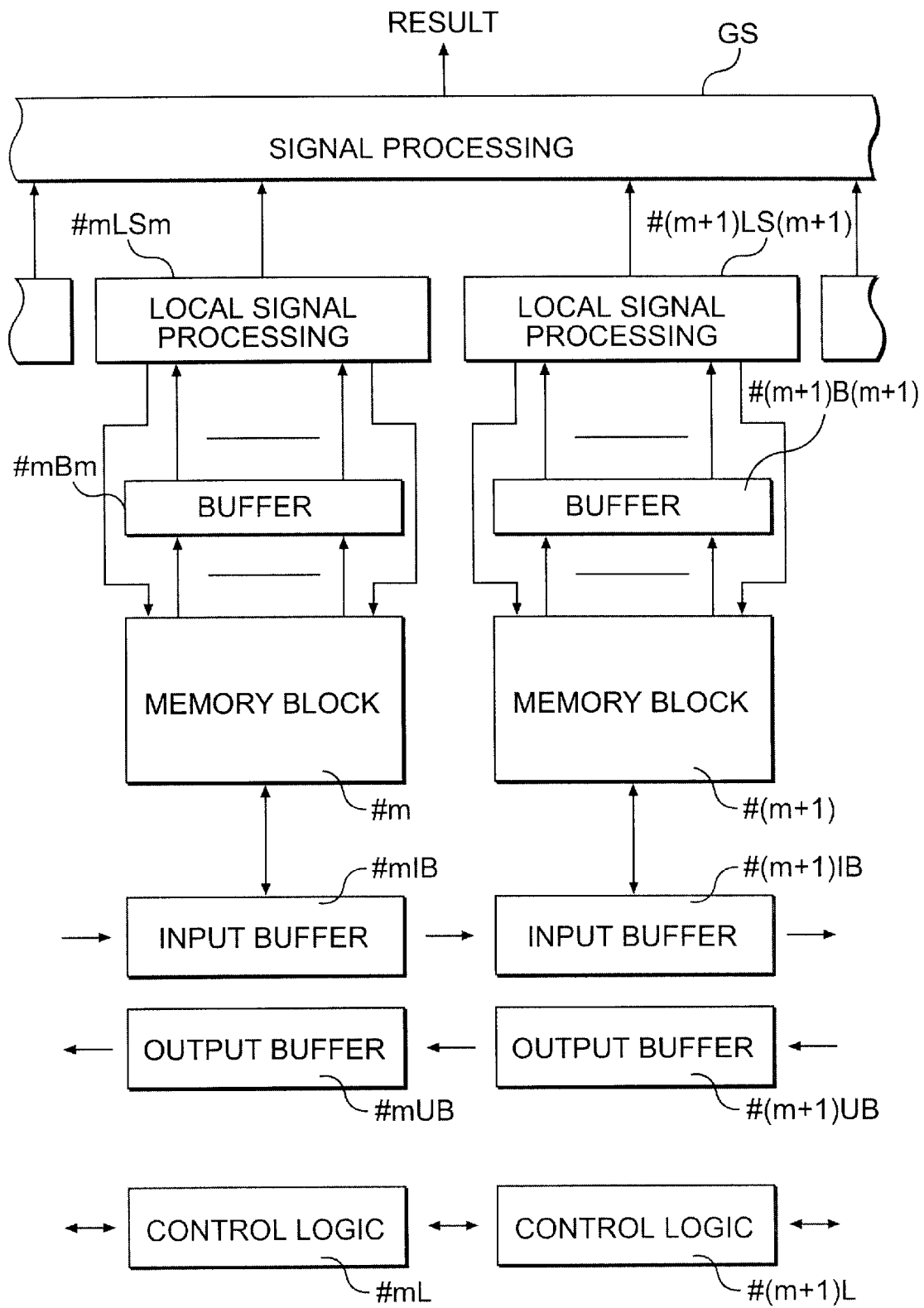
FIG. 7 shows a third embodiment of the memory structure according to the invention.

In all of the above described embodiments of the memory the input and output data has been inputted respectively outputted on the same side of the memory block. FIG. 7 shows an embodiment where whole stored vectors can either be outputted according to the above described embodiment and also or alternatively it is possible to perform signal processing on data stored in different memory blocks simultaneously, i.e. parallelly.

The signal processing can for example concern the replacement of special symbols throughout a stored text string in order to later output the whole of the stored vector through the output buffers shown in dashed lines. In such a case the data is transferred after processing back to the memory field in the memory plane from which it was taken. Alternatively or as a complement a more sophisticated signal processing can be performed. An advantage with this embodiment is that the signal processing of a large amount of stored data can be performed quickly.

It can also be possible to perform some sort of treatment of the stored data in order to investigate a special characteristic or to get out a result. In such a case one is perhaps not at all interested in being able to output an inputted vector and then the output buffers shown in dashed lines are not needed. These are therefore not at all necessary in accordance with the invention.

Every memory block, for example #m, has a processing buffer $mB_m$ connected to it to which the control logic #mL can send the contents in a memory plane, memory field by memory field, in the same way as to its output buffer. The contents of the buffer #m,$B_m$ is then transferred to a local signal processing unit #m,$LS_m$ in which the special signal processing is performed. Subsequently, the processed data can either, as mentioned above and shown dashed in the figure, be transferred back to the memory field or memory fields from which it was taken or transferred to a signal processing unit GS common for all the blocks which extracts a result and outputs it, or both of these. It should be noted that this extraction of a result can be done on separate memory planes, memory fields in a memory plane or in the whole memory block depending on what it is that is stored in the different memory blocks. Because the type of signal treatment which is used is of no concern for the inventive concept then below there is only given one example of it, namely that of whole memory blocks or memory planes in memory blocks.

It is also possible to perform the processing in all the memory planes in the same memory block in the above mentioned manner. A situation where this could happen is the storage of video signals for picture production wherein each line in a picture can be stored in different memory planes in the memory blocks. The invention makes it possible to get quick and easy access to and perform picture processing on portions of the picture where the lines are collected in a special memory block or in several adjacent memory blocks. This makes it possible to perform quick picture processing on any type of picture.

APPLICATION ADVANTAGES

Examples of vectors which are especially suited to be stored by the method according to the invention are volumes of text from a word processor. The volume of text can be defined as the start point for a vector and its length. But one does not actually have to identify where it is. An advantage with using the invention is that the computer speed is considerably increased.

Traditionally volumes of text are stored divided up on different places on, for example, a hard disc. In order to retrieve stored information one first addresses one sector, takes out the information there, addresses another sector, gets out the information there and so on. There is therefore then much addressing and waiting for information.

Traditionally, it is also such that taking information from a nearby position is relatively fast. The more memory one has to look through then the longer time it takes. In this way the data speed reduces in proportion to how big the memory is and how spread out the information is.

In the invention, the start point for the information is in a vector at the in/output of the memory and is like a string. That is, in the different planes #mi,Qj, where j is any number between 1 and N, the string extends from the in/output deeper into the memory. A new vector can be inputted into the memory without a break to look for suitable positions. Similarly, a stored vector can be outputted without a break in the embodiments where outputting is necessary. This means that one can make the quantity of information infinitely large without in any way impairing the access time. The end point for a vector is marked for the memory field in the last memory blocks where the vector is written and is readable by the control logic in the memory block which stores this information in its internal memory. Simultaneous reading and writing of the memory can take place. This control logic consequently always knows the end point for both inputting and outputting and signals this to the other control logics especially during the outputting of the end of the vector through the respective output buffers.

Each control logic iS comprises therefore a list for each information vector which states which information entity it is and the start and the stop for the vector part which can be written in its associated memory block and links. This part of the control logic is suitably performed in hardware which is more efficient than in a dynamic memory. An embodiment of the control logic for the embodiments in FIGS. 1–5 can be performed like that in FIG. 6 without delay 16. The memory will look like a normal memory from outside. The only limitation which applies to the memory according to the invention is that it is only efficient during the treatment of vectors. The memory can be included as part of the ordinary memory of a computer.

In the new system, information be quickly found and data transfer take place quickly. A memory block can be a part of a chip, i.e. several memory blocks can be on the same chip or the memory blocks can also be in separate chips. Alternatively, each memory block can be formed of several chips or be built of standard components. All these possibilities can be on the market together which implies flexible use with a combination of different units.

If it appears that the vectors for an application tend to be so long that they must be divided up into several vectors in order to be able to be stored in the memory, then there is for example the possibility to couple extra memory blocks (chips) after the last one in a simple manner in order in this way to be able to extend the storage space for vectors which can be stored.

Another area of use is telephone traffic where data can arrive serial bit form in the case that there are suitable converter units 5 for information coming to the first input buffer for converting from bit to byte.

The input buffers can also be organized so that they are serial shift registers (special case). One can also have serial shift registers on the input buffers and parallel shift registers on the output buffers or vice versa. It is a question of implementation in the event one chooses to first perform up-parallelling of data. This is very probable if one considers a future telecommunication application. There the incoming information is serial. Then a first parallel conversion is performed in the component 5 external to the memory.

Each control logic 4 and mS can be in the form of a simple data chip with a fixed program. Alternatively the control logic mS can be integrated together with the memory planes. FIGS. 4 and 5 show a design of a flow diagram for the control logic. The functions which are achieved with the flow diagrams have been described above which is why the flow diagrams do not in themselves require any extra description but can be directly understood by the man skilled in the art.

Many conceivable modifications within the scope of the invention are given in the appended claims.

What is claimed is:

1. A memory structure for storing memory vectors comprising:
   a plurality of blocks containing a plurality of storage locations for storing memory vectors, each block being organized as a plurality of memory planes with data memory fields, where like numbered planes of each memory block constitute said storage locations such that all storage locations each have a part in each memory block, the storage locations being arranged parallel to each other and extending from a memory input deeper into the memory such that each memory vector is arranged to be undividedly stored in sequential order with a beginning of a vector at the memory input;
   addressing means for individually addressing each of said storage locations for storing and reading each memory vector to and from said plurality of memory blocks;
   input buffers arranged to input the memory vectors unbroken sequence according to the addressing, the input buffers being cascade coupled with each other and the vectors being inputted in a buffer-by-buffer manner in the memory fields;
   output buffers arranged to output the memory vectors in unbroken sequence according to the addressing in a buffer-by-buffer manner; and
   control logic arranged in each memory block for controlling inputting of information into the memory fields via the input buffers, and wherein the control logic in each memory block is arranged to inform the control logic in next memory block when the memory fields in the next memory block can take over reading in of the information into the memory fields in the next memory block.

2. The memory structure according to claim 1, wherein the storage locations are extendable through coupling together at least two memory blocks.

3. The memory structure according to claim 2, wherein each memory block comprises as the storage locations a plurality of data memory fields into which information from the input buffers is entered sequentially or in a parallel manner, the memory structure further comprising:
   control logic arranged in every memory block for controlling inputting of information into the memory fields via the input buffers, wherein the memory blocks are cascade coupled with each other through the input buffers being cascade coupled with each other such that the information is serially feedable in a step-by-step manner through several of the buffers in the memory blocks after one another, and wherein the control logic in each memory block is arranged to inform the control logic in a next memory block when the memory fields in each memory block are filled such that the control logic in the next memory block can take over reading in of the information into the memory fields in the next memory block.

4. The memory structure according to claim 1, wherein the control logic is arranged to control output of the information from the memory fields via the output buffers and to inform the control logic in the next memory block when the memory fields in each memory block are emptied of information such that the control logic in the next memory block can take over the work of reading out the information in the memory fields into the next memory block.

5. The memory structure according to claim 3, wherein the control logic is arranged to control output of the information from the memory fields via the output buffers and to inform the control logic in the next memory block when the memory fields in each memory block are emptied of information such that the control logic in the next memory block can take over the work of reading out the information in the memory fields into the next memory block.

6. The memory structure according to claim 1, wherein the buffers serially feed bytes in a step-by-step manner.

7. The memory structure according to claim 1, wherein trasferring of information between memory fields and buffers takes place in a parallel manner with an entire information content simultaneously controlled by the control logic.

8. The memory structure according to claim 1, wherein information may be continuously transferred through the input buffers and/or output buffers without handshaking operations.

9. The memory structure according to claim 1, wherein the buffers are arranged parallel to each other and are controllable independently of each other, thereby permitting simultaneous input of information to and output of information from the storage locations.

10. The memory structure according to claim 1, further comprising:
    means for phase shifting of a reading period in relation to a writing period by a selected number of clock pulses.

11. The memory structure according to claim 10, wherein the phase shifting means comprises an adjustable delay circuit with a delay corresponding to the phase shifting.

12. The memory structure according to claim 1, wherein information stored in different memory blocks is readable in a parallel manner to a respective processing arrangement.

13. The memory structure according to claim 12, wherein processed information is restorable in the different memory blocks after processing.

14. The memory structure according to claim 12, wherein processed information is transferable to a result unit that combines the processed information from the processing arrangement of the memory blocks to a result.

15. The memory structure according to claim 13, wherein processed information is transferable to a result unit that combines the processed information from the processing arrangement of the memory blocks to a result.

16. The memory structure according to claim 1, wherein each memory block comprises a plurality of data memory fields into which information from the input buffers is entered sequentially or in a parallel manner.

17. The memory structure according to claim 1, wherein each storage location has a length adapted to a length of a memory vector stored therein.

18. The memory structure according to claim 1, wherein data is input and output simultaneously.

* * * * *